United States Patent [19]

Tanaka et al.

[11] Patent Number: 4,824,485

[45] Date of Patent: Apr. 25, 1989

[54] RECORDING LIQUID

[75] Inventors: Mitsugu Tanaka; Takeo Sakai, both of Kanagawa, Japan

[73] Assignee: Fuji Photo Film Co., Ltd., Kanagawa, Japan

[21] Appl. No.: 41,493

[22] Filed: Apr. 23, 1987

[30] Foreign Application Priority Data

Apr. 24, 1986 [JP] Japan .................................. 61-95321

[51] Int. Cl.⁴ ............................................. C09D 11/02
[52] U.S. Cl. ...................................... 106/22; 534/707; 534/711
[58] Field of Search .................... 106/22; 534/707, 711

[56] References Cited

U.S. PATENT DOCUMENTS 4,426,326  1/1984  Bailey et al. ..................... 534/707

Primary Examiner—Paul Lieberman
Assistant Examiner—Christine A. Skane
Attorney, Agent, or Firm—Sughrue, Mion, Zinn, Macpeak & Seas

[57] ABSTRACT

A recording liquid containing at least one compound represented by formula (I)

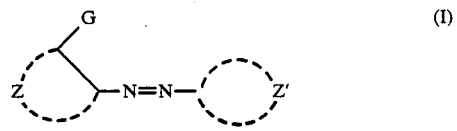

wherein Z represents an atomic group forming at least one substituted or unsubstituted 5-membered to 7-membered aromatic or heterocyclic ring; Z' represents at least one substituted or unsubstituted 5-membered to 7-membered aromatic or heterocyclic ring which contains in its ring (i) a nitrogen atom acting as a coordinating atom or (ii) a carbon atom to which a nitrogen atom acting as a coordinating atom is directly bonded at a position adjacent to the position to which the azo group is bonded; and G is a metal-chelating group. The recording liquid exhibits improved light-resistance and water-resistance as well as satisfactory hue and absorbance.

11 Claims, No Drawings

RECORDING LIQUID

FIELD OF THE INVENTION

This invention relates to a non-aqueous (or oily) recording liquid comprising an organic solvent as a main component, and more particularly to a recording liquid having excellent light-resistance.

BACKGROUND OF THE INVENTION

Various types of recording liquids have been proposed for ball-point pens, felt-tipped pens, fountain pens, and ink jets. These recording liquids usually comprise dyes or pigments dissolved or dispersed in water or organic solvents.

Aqueous recording liquids comprising water-soluble dyes dissolved in water or a mixture of water and a small amount of an organic solvent are poor in writing performance on paper having high degrees of sizing due to a low penetrability thereinto. The image recorded with aqueous recording liquids is difficult to handle due to poor water resistance and sometimes undergoes reduction in definition due to blotting. In particular, tone sharpness of color images is apt to be impaired by blotting and mixing of recording liquids having different colors. In an attempt of overcoming these disadvantages associated with aqueous recording liquids, non-aqueous recording liquids, in which an oil-soluble dye is dissolved in a medium mainly comprising an organic solvent, are also proposed. However, none of oil-soluble dyes used in non-aqueous recording liquids so far proposed satisfies every or many of performance properties required, such as hue, absorbance, light-resistance, and solubility.

SUMMARY OF THE INVENTION

One object of this invention is to eliminate the above-described disadvantages of conventional recording liquids, and more particularly to provide a recording liquid having improved light-resistance while retaining satisfactory hue and absorbance.

Another object of this invention is to provide a recording liquid excellent in water-resistance.

As a result of extensive investigations, it has now been found that the above objects can be accomplished by a recording liquid containing a compound represented by formula (I) shown below or a metal chelate compound thereof.

Formula (I) is represented by

(I)

wherein Z represents an atomic group forming at least one substituted or unsubstituted 5-membered to 7-membered aromatic or heterocyclic ring; Z' represents at least one substituted or unsubstituted 5-membered to 7-membered aromatic or heterocyclic ring which contains in its ring (i) a nitrogen atom acting as a coordinating atom or (ii) a carbon atom to which a nitrogen atom acting as a coordinating atom is directly bonded at a position adjacent to the position to which the azo group is bonded; and G represents a metal-chelating group.

The compounds represented by formula (I) are soluble in organic solvents and are suitable for use in non-aqueous recording liquids. Since they can be formulated into recording liquids at high concentrations, they are particularly suitable for use in ink jet recording devices in which recording is effected with fine droplets of an ink.

DETAILED DESCRIPTION OF THE INVENTION

In formula (I), one or more hydrogen atoms on the ring formed by Z or Z' may be substituted with substituents. The substituents are selected from an alkyl group, an alkoxy group, an aryloxy group, an aralkyl group, an aryl group, a halogen atom, a cyano group, a nitro group, an ester group, a carbamoyl group, an acyl group, an acylamino group, a sulfonyl group, a sulfamoyl group, a sulfonamido group, an amino group, an alkylamino group, an arylamino group, and a hydroxyl group.

The ring formed by Z or Z' preferably includes a benzene ring, a naphthalene ring, a pyridine ring, a quinoline ring, a pyrazole ring, a thiophene ring, an indole ring, and a pyrazolotriazole ring. The substituents on these rings preferably include a substituted or unsubstituted alkyl group having from 1 to 25 carbon atoms, a substituted or unsubstituted alkoxy group having from 1 to 25 carbon atoms, a halogen atom, a cyano group, a nitro group, a substituted or unsubstituted alkylsulfamoyl group having from 1 to 25 carbon atoms, a substituted or unsubstituted phenylsulfamoyl group having from 6 to 30 carbon atoms, an ester group having from 1 to 25 carbon atoms, a carbamoyl group having from 1 to 25 carbon atoms, an acyl group having from 1 to 25 carbon atoms, an acylamino group having from 1 to 25 carbon atoms, a sulfonyl group having from 1 to 25 carbon atoms, a sulfonamido group having from 1 to 25 carbon atoms, an alkylamino or arylamino group represented by formula

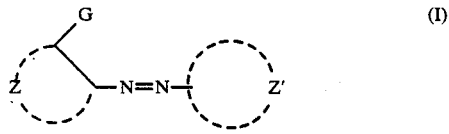

wherein $R_1$ and $R_2$ each represents a hydrogen atom, a substituted or unsubstituted alkyl group having from 1 to 25 carbon atoms, or a substituted or unsubstituted phenyl group, or $R_1$ and $R_5$ are taken together to form a 5- to 6-membered ring, and a hydroxyl group.

The metal-chelating group as represented by G preferably includes a hydroxyl ion, a carboxylate ion, a sulfonamido ion, a sulfamoyl ion, an amino group, and an alkylthio group, with a hydroxyl ion being more preferred.

The compounds represented by formula (I) according to the present invention preferably contain at least one oil-solubilizing group bonded to the dye moiety to render the dye easily soluble in non-aqueous solvents.

The oil-solubilizing group to be used includes a substituted or unsubstituted alkyl group having from 5 to 30 carbon atoms and a substituted or unsubstituted aryl group having from 10 to 35 carbon atoms. The substituent for these alkyl and aryl groups includes an alkyl group, an alkoxy group, an aryloxy group, an aralkyl group, an aryl group, a halogen atom, a cyano group, a nitro group, an ester group, a carbamoyl group, an acyl group, an acylamino group, a sulfonyl group, a sulfamoyl group, a sulfonamido group, an amino group, an alkylamino group, an arylamino group and a hydroxyl group.

These oil-solubilizing groups may be bonded to the dye moiety either directly or via an ether group, an ester group, a carbamoyl group, an acyl group, an acyl- amino group, a sulfonyl group, a sulfamoyl group, a sulfonamido group, an amino group, or an alkylamino group.

It is preferable that the oil-solubilizing group to be used in this invention does not contain such a group that is liable to redox reaction or hydrolysis reaction.

Preferred among the compounds of formula (I) are chelate compounds represented by formula (II)

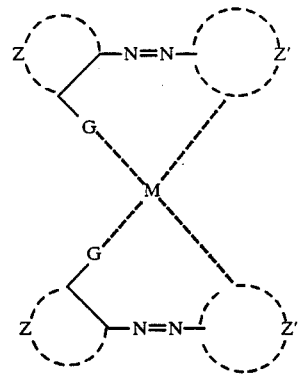

(II)

wherein Z, Z', and G are as defined above; and M represents a divalent metal ion having a coordination number of 6.

In formula (II), M preferably represents nickel (II), zinc (II), and cobalt (II), with nickel (II) being more preferred.

Specific examples of the compounds according to the present invention are illustrated below.

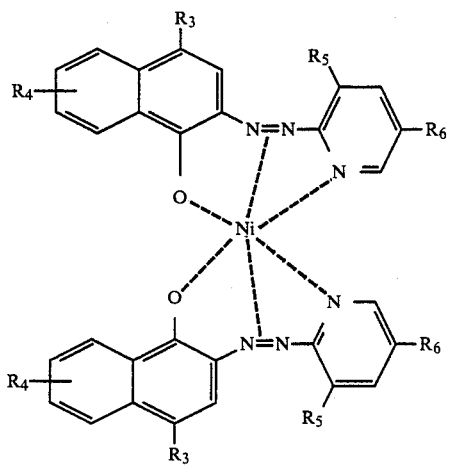

(III)

| Compound No. | $R_3$ | $R_4$ | $R_5$ | $R_6$ |
|---|---|---|---|---|
| 1 | $-SO_2NH(CH_2)_3O-\phantom{x}$ phenyl with $C_5H_{11}(t)$ and $C_5H_{11}(t)$ | H | H | H |
| 2 | $-SO_2N(C_8H_{17})_2$ | H | H | H |
| 3 | $-O-CH(CH_3)CONHC_{16}H_{33}$ | H | $-OCH_3$ | $-SO_2NH_2$ |
| 4 | $-O-CH(CH_3)CONH-\phantom{x}$phenyl$-COOC_{12}H_{25}$ | H | H | $NO_2$ |

-continued
(III)
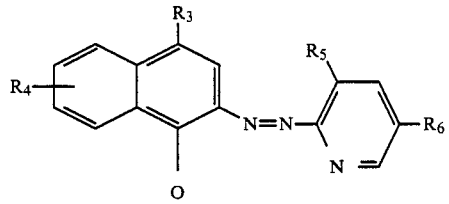
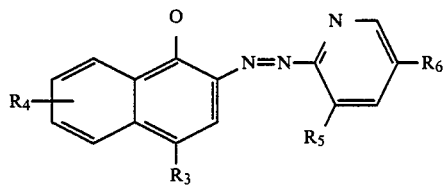
| Compound No. | R₃ | R₄ | R₅ | R₆ |
|---|---|---|---|---|
| 5 | $-O-CH(CH_3)CON(C_6H_{13})_2$ | 5-NHSO₂CH₃ | H | H |
| 6 | $-O-CH(CH_3)CON(C_6H_{13})_2$ | 8-NHSO₂CH₃ | H | H |
| 7 | (complex Ni structure shown) | | | |

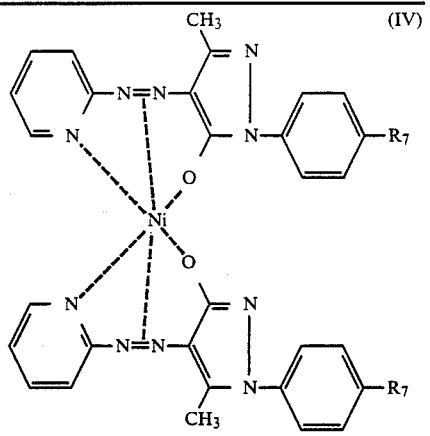
(IV)
| Compound No. | R$_7$ |
|---|---|
| 8 | —SO$_2$NH(CH$_2$)$_3$O—C$_6$H$_3$(C$_5$H$_{11}$(t))$_2$ |
| 9 | —SO$_2$N(C$_8$H$_{17}$)$_2$ |
| 10 | —CONHC$_{16}$H$_{33}$ |
| 11 | —NHCOC$_{15}$H$_{31}$—iso |
(V)
| Compound No. | R$_8$ | R$_9$ |
|---|---|---|
| 12 | morpholino | —SO$_2$N(C$_8$H$_{17}$)$_2$ |
| 13 | —N(C$_8$H$_{17}$)$_2$ | H |
| 14 | —N(C$_8$H$_{17}$)$_2$ | —NO$_2$ |
| 15 | morpholino | —SO$_2$NH(CH$_2$)$_3$O—C$_6$H$_3$(C$_5$H$_{11}$(t))$_2$ |
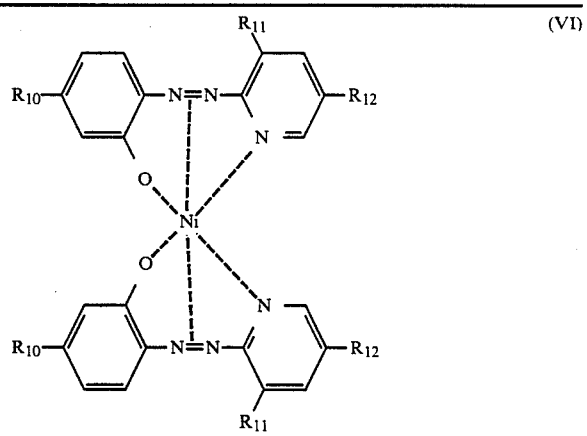
(VI)
| Compound No. | R$_{10}$ | R$_{11}$ | R$_{12}$ |
|---|---|---|---|
| 16 | —N(C$_8$H$_{17}$)$_2$ | H | H |
| 17 | —N(C$_8$H$_{17}$)$_2$ | H | Cl |
| 18 | morpholino | CH$_3$ | —SO$_2$NH(CH$_2$)$_3$O—C$_6$H$_3$(C$_5$H$_{11}$(t))$_2$ |
| 19 | —N(CH$_3$)(C$_6$H$_5$) | Cl | —SO$_2$N(C$_4$H$_9$)$_2$ |

-continued
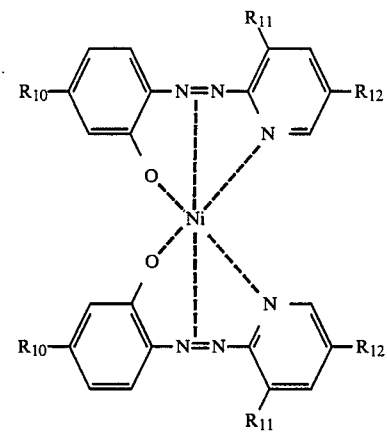
(VI)
| Compound No. | R₁₀ | R₁₁ | R₁₂ |
|---|---|---|---|
20
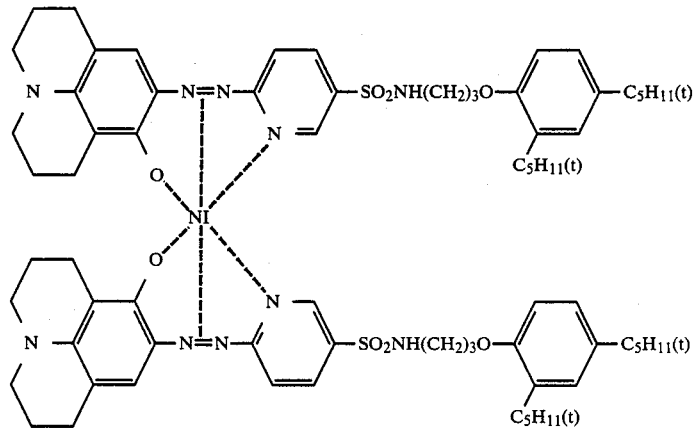
21
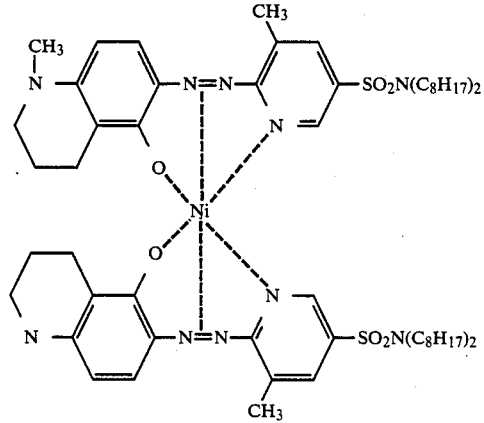

-continued
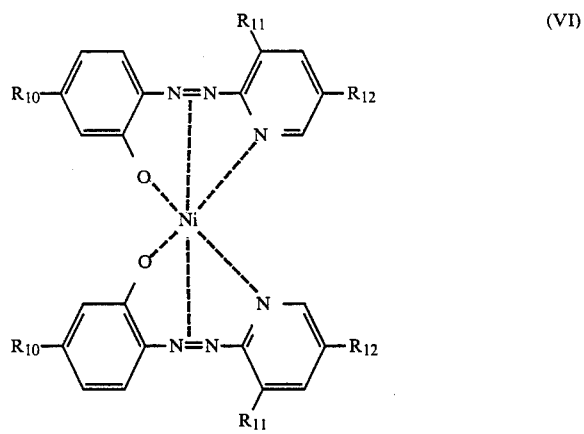
(VI)
| Compound No. | $R_{10}$ | $R_{11}$ | $R_{12}$ |
|---|---|---|---|
| 22 | | | |
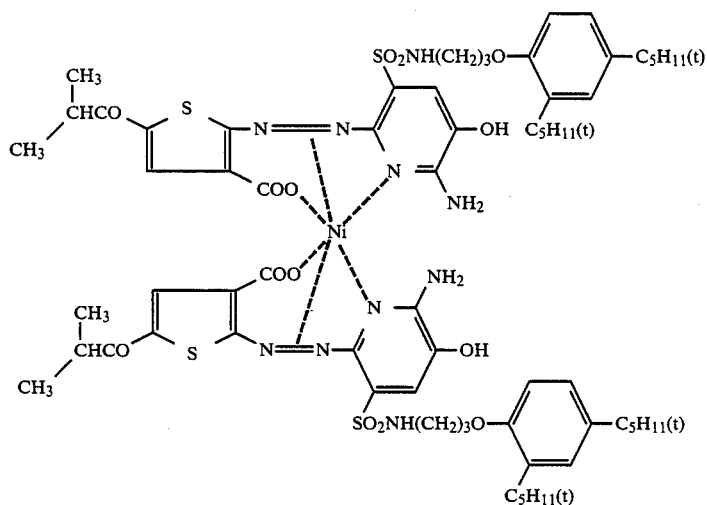
23
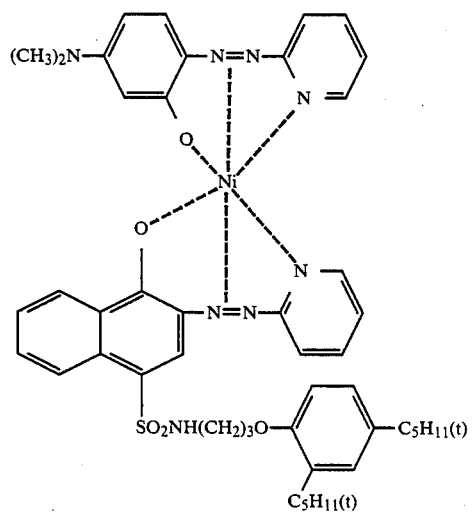

-continued
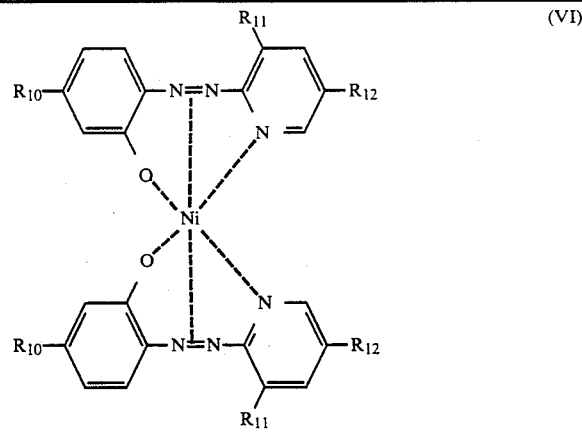
(VI)
| Compound No. | $R_{10}$ | $R_{11}$ | $R_{12}$ |
|---|---|---|---|
| 24 | | | |
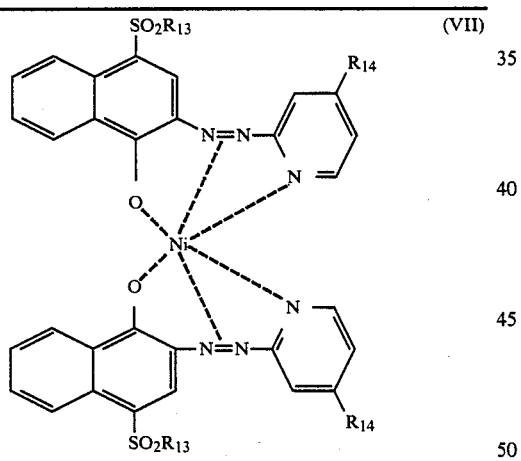
(VII)
| Compound No. | $R_{13}$ | $R_{14}$ |
|---|---|---|
| 25 |  | H |
| 26 | 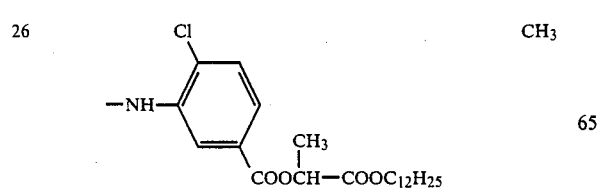 | $CH_3$ |
-continued
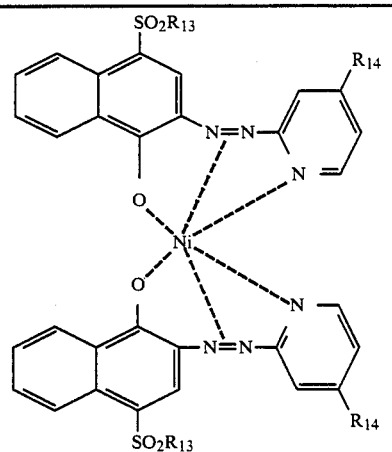
(VII)
| Compound No. | $R_{13}$ | $R_{14}$ |
|---|---|---|
| 27 | 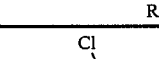 | $CH_3$ |

-continued $$\text{(VII)}$$

[Structure VII: Nickel complex with two naphthol-azo-pyridine ligands bearing SO₂R₁₃ and R₁₄ substituents]

| Compound No. | $R_{13}$ | $R_{14}$ |
|---|---|---|
| 28 | —NH—(4-Cl-C₆H₄)—NHCOCH(C₂H₅)—O—(3,5-di-C₅H₁₁(t)-C₆H₃) | CH₃ |
| 29 | —N(CH₂CH₂CN)—(CH₂)₃—O—(3,5-di-C₅H₁₁(t)-C₆H₃) | CH₃ |

Synthesis examples for the compounds according to the present invention are shown below.

SYNTHESIS EXAMPLE 1

Synthesis of Compound No. 24

(1) Synthesis of 4-Chlorosulfonyl-2-(2-Pyridylazo)-1-Naphthol

A mixture consisting of 10 g of 4-hydroxy-3-(2-pyridylazo)-1-naphthalenesulfonic acid prepared by the process of Japanese patent application (OPI) No. 35533/78 (the term "OPI" as used herein means "unexamined published patent application"), 100 ml of sulforan, and 15 ml of phosphorous oxychloride was heated at an inner temperature of from 55° to 65° C. for 3 hours while stirring. The reaction mixture was cooled to room temperature and poured into 1 l of ice-water. The precipitated crystals were collected by filtration, washed with water, and air-dried to obtain 10.1 g of the desired compound.

(2) Synthesis of Compound No. 24

Seven grams of the intermediate prepared above was slowly added to a mixture of 20 g of 3-(2,5-di-t-amylphenoxy)propylamine and 70 ml of N,N-dimethylacetamide at room temperature while stirring. After stirring for 1 hour, the reaction mixture was poured into a mixture of 3 ml of concentrated hydrochloric acid and 150 ml of methanol. Into the mixture was slowly poured 15 ml of water, and the precipitated crystals were collected by filtration, washed with a 10/1 (by volume) mixture of methanol and water, and dried in air to obtain 10.1 g of Compound No. 24, i.e., 4-[3-(2,4-di-t-amylphenoxy)propylsulfamoyl]-2-(2-pyridylazo)-1-naphthol.

SYNTHESIS EXAMPLE 2

Synthesis of Compound No. 1

A solution comprising 6 g of Compound No. 24 as prepared in Synthesis Example 1 and dimethylformamide was poured into a solution comprising nickel chloride hexahydrate and 120 ml of N,N-dimethylformamide at room temperature while stirring. After stirring for 1 hour, the reaction mixture was poured into a mixture of 200 ml of glacial acetic acid and 2 l of water. The precipitated crystals were collected by filtration and washed with water. The crystals were purified by silica gel column chromatography using chloroform/methyl acetate (10/1 by volume) as a developing solvent to obtain 5.3 g of Compound No. 1.

SYNTHESIS EXAMPLE 3

Synthesis of Compound No. 8

(1) Synthesis of 1-{4-[3-(2,4-Di-t-Amylphenoxy)-propylsulfamoyl]Phenyl}-3-Methyl-4-(2-Pyridylazo)-2-Pyrazolin-5-one To a mixture of 8.7 g of 3-(2,5-di-t-amylphenoxy)propylamine and 50 ml of N,N-dimethylacetamide was added slowly 3.8 g of 1-(4-chlorosulfonylphenyl)-3-methyl-4-(2-pyridylazo)-2-pyrazolin-5-one synthesized by the process of Japanese patent application (OPI) No. 35533/78 at room temperature while stirring. After stirring for an additional hour, the reaction mixture was poured into 300 ml of water and extracted with 200 ml of ethyl acetate. The extract was distilled off to remove ethyl acetate, and the residue was purified by silica gel column chromatography using chloroform-ethyl acetate (10/1 by volume) as a developing solvent to obtain 4.5 g of the desired compound.

(2) Synthesis of Compound No. 8

Two grams of the intermediate compound as obtained in (1) above and 30 ml of N,N-dimethylformamide were poured into a mixture of 1.7 g of nickel acetate tetrahydrate and 40 ml of N,N-dimethylformamide, followed by stirring for one hour. The reaction mixture was poured into 500 ml of water, and the precipitated crystals were collected by filtration and washed with water. The crude crystals were purified by silica gel column chromatography using chloroform-ethyl acetate (5/1 by volume) to obtain 1.5 g of Compound No. 8.

When the metal-free compound of formula (I) according to the present invention is used, it is necessary to incorporate a metal compound, e.g., a metal ion or a metal chelate compound, capable of reacting with the metal-free compound of formula (I) to form a metal chelate compound of formula (II) in or on a support of a recording material either before or after recording. The metal compound includes inorganic salts (e.g., chloride, sulfates, etc.) of metals and metal compounds having a ligand which is coordinated at an oxygen atom, a nitrogen atom, or a sulfur atom (e.g., iminodiacetic acid, salicylic acid, acetylacetone, ethylenediamine, etc.). These ligands may be bonded to a polymeric chain as described in Japanese patent application (OPI) No. 48210/80. Incorporation of such a metal compound can be carried out by immersing the support in a liquid containing the metal compound or spraying or coating a coating composition containing the metal compound onto the surface of the support. If desired, the coating composition may contain known pigment(s) and known adhesive(s). Pigments that can be used include clay, talc, calcium carbonate, calcium sulfate, calcium silicate, zinc oxide, kaolin, aluminum silicate, magnesium silicate, acid clay, magnesium oxide, magnesium carbonate, aluminum oxide, silica, and organic pigments. Adhesives that can be used include casein, starch, gelatin, polyvinyl alcohol, carboxymethyl cellulose, hydroxyethyl cellulose, a styrene-butadiene latex, methyl methacrylate, a butadiene latex, vinyl acetate latices, polyacrylic latices, etc.

The support of the recording material can be paper, cloth, plastic film, a metal plate, a wood plate, a glass plate, and the like. Paper supports mainly comprise wood pulp and may further contain, if desired, synthetic fibers, synthetic pulp, inorganic fibers, etc.

The liquid medium for the recording liquids of the present invention is selected appropriately from among conventionally employed organic solvents. Specific examples of usable organic solvents are alcohols, e.g., ethanol, pentanol, heptanol, octanol, cyclohexanol, benzyl alcohol, phenylethyl alcohol, phenylpropyl alcohol, furfuryl alcohol, anise alcohol, etc.; glycol derivatives, e.g., ethylene glycol monoethyl ether, ethylene glycol monophenyl ether, diethylene glycol monoethyl ether, diethylene glycol monobutyl ether, propylene glycol monoethyl ether, propylene glycol monophenyl ether, dipropylene glycol monomethyl ether, dipropylene glycol monoethyl ether, ethylene glycol diacetate, ethylene glycol monomethyl ether acetate, diethylene glycol monoethyl acetate, ethylene glycol diacetate, propylene glycol diacetate, etc.; ketones, e.g., benzyl methyl ketone, benzylacetone, diacetone alcohol, cyclohexanone, etc.; ethers, e.g., butyl phenyl ether, benzyl ethyl ether, hexyl ether, etc.; esters, e.g., ethyl acetate, amyl acetate, benzyl acetate, phenylethyl acetate, benzyl propionate, ethyl benzoate, butyl benzoate, ethyl laurate, butyl laurate, isopropyl myristate, isopropyl palmitate, triethyl phosphate, tributyl phosphate, diethyl phthalate, dibutyl phthalate, diethyl malonate, dipropyl malonate, diethyl diethylmalonate, diethyl succinate, dibutyl succinate, diethyl adipate, dipropyl adipate, dibutyl adipate, diethyl maleate, dibutyl maleate, dioctyl maleate, dibutyl maleate, dioctyl maleate, diethyl fumarate, dioctyl fumarate, etc.; hydrocarbon solvents, petroleum ether, petroleum benzine, tetralin, decalin, t-amylbenzene, dimethylnaphthalene, etc.; and polar solvents, e.g., acetonitrile, formamide, N,N-dimethylformamide, dimethyl sulfoxide, sulforan, propylene carbonate, N-methyl-2-pyrrolidone, N-vinyl-2-pyrrolidone, etc. These solvents may be used either individually or in combinations of two or more thereof. Of these solvents, those having two ester groups are preferred, and more preferred are those having a boiling point of 140° C. or higher.

In cases where the recording liquid is applied to ink jet recording devices making use of static electricity, the recording liquid preferably contains alcohols, glycol derivatives, ketones, or polar solvents having a relatively low electrical resistance in an amount of from 2 to 50% by weight of the recording liquid.

If desired, the recording liquid of the present invention may contain various additives, such as viscosity-controlling agents, surface tension-controlling agents, specific resistance-controlling agents, film-forming agents, ultraviolet absorbents, antioxidants, discoloration inhibitors, and the like.

In the preparation of the recording liquid for various recording systems, the compound of formula (I) is appropriately mixed with the above-described medium and various additives so as to have prescribed physical properties.

The recording liquid to be applied to ink jet recording devices utilizing static electricity preferably has a specific resistivity of from $10^5$ to $10^{11}$ Ω.cm, and more preferably from $10^6$ to $10^8$ Ω.cm, and preferably contains the compound of formula (I) at a concentration of from 1 to 20% by weight, and more preferably from 3 to 10% by weight.

The recording liquids in accordance with the present invention are applicable to not only ink jets but also other writing tools, such as ball point pens.

The present invention is now illustrated in greater detail by way of Examples, but it is to be understood that the present invention is not limited thereto. In these examples, all the parts and percents are by weight unless otherwise indicated.

EXAMPLE 1

| Compound No. 1 | 4 parts |
| Diethyl phthalate | 32 parts |
| Diethyl adipate | 48 parts |
| Dipropylene glycol monomethyl ether | 16 parts |

The above components were mixed to form a uniform solution and filtered through a filter having a pore size of 1 μm, to prepare an ink having a specific resistivity of $3.3 \times 10^7$ Ω.cm and a viscosity of 4.9 cp as determined at 25° C.

The resulting ink was charged in an ink jet device of the electrostatic acceleration type, and recording was carried out on an ink jet recording paper having a coating layer comprising mainly fine particles of silicon oxide and polyvinyl alcohol (75:25 by weight). There was obtained a clear and high-density magenta image. When the ink image was allowed to stand under room light for 3 months, the reduction in density was not more than 1%. When the paper having the ink image was dipped in water for 10 minutes, no blotting or run off of the image was observed.

EXAMPLE 2

Inks (2-1) and (2-2) were prepared in the same manner as described in Example 1, except for using the following formulations.

Formulation of Ink (2-1):

| Compound No. 8 | 5 parts |
| Diethyl diethylmalonate | 55 parts |
| Isopropyl myristate | 25 parts |
| Benzyl alcohol | 15 parts |

Formulation of Ink (2-2):

| Compound No. 15 | 4 parts |
| Dioctyl maleate | 90 parts |
| N—Methyl-2-pyrrolidone | 6 parts |

Each of these inks was charged in an ink jet device of electrostatic acceleration type, and recording was carried out on an ink jet recording paper having a coating layer comprising mainly fine particles of silicon oxide and polyvinyl alcohol (75:25 by weight). Both Inks (2-1) and (2-2) exhibited satisfactory jetting properties and provided a clear yellow image and a black image, respectively. When these images were allowed to stand under room light for 3 months, the reduction in density was not more than 1%. Further, when the paper having the ink image was immersed in water for 10 minutes, neither blotting nor density reduction after drying was observed in either case.

EXAMPLE 3

To 130 g of an aqueous dispersion containing 25% of aluminum silicate were added 10 g of a styrene-butadiene latex (solid content: 48%) and 10 g of water, and the mixture was thoroughly stirred to form a solution. The resulting solution was coated on commercially available coated paper having a basis weight of 64 g/m² with a wire bar to provide a layer having a solids thickness of 10 g/m², to thus obtain Coated Paper (1).

A solution containing 0.25 g of $K[Ni(H_2NCH_2CO_2)_3]$ was coated on commercially available coated paper in the same manner as above to obtain Coated Paper (2).

An ink having the following formulation was prepared in the same manner as in Example 1 and applied to each of Coated Papers (1) and (2) using an ink jet device of electrostatic acceleration type. The results of evaluations on the resulting image are shown in Table 1.

Ink Formulation:

| | |
|---|---|
| Compound No. 24 | 4 parts |
| Diethyl phthalate | 32 parts |
| Diethyl adipate | 48 parts |
| Dipropylene glycol monomethyl ether | 16 parts |

TABLE 1

| | Coated Paper (1) | Coated Paper (2) |
|---|---|---|
| Color of Image | slightly yellowish magenta image | clear magenta image |
| Maximum Density* | 0.87 | 1.21 |
| Density Reduction** | 14% | not more than 1% |

Note:
*Determined using a Macbeth densitometer RD 519 Model.
**Determined in the same manner as in Example 1.

EXAMPLE 4

| | |
|---|---|
| Compound No. 1 | 10 parts |
| Compound No. 8 | 10 parts |
| Phenyl glycol | 39 parts |
| Benzyl alcohol | 15 parts |
| N—Methyl-2-pyrrolidone | 10 parts |
| Polyoxyethylene oleyl ether (5 mols of ethylene oxide added) | 10 parts |
| Alcox R-150 (polyoxyethylene resin produced by Meisei Chemical Works, Ltd.) | 6 parts |

The above components were mixed to prepare a red ink for a ball point pen. When paper dyed with this ink was allowed to stand under room light for 3 months, density reduction was not more than 1%.

While the invention has been described in detail and with reference to specific embodiments thereof, it will be apparent to one skilled in the art that various changes and modifications can be made therein without departing from the spirit and scope thereof.

What is claimed is:

1. A non-aqueous organic solvent containing recording liquid containing at least one organic solvent soluble compound represented by formula (I)

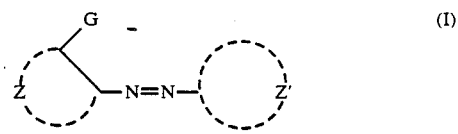

wherein Z represents an atomic group forming at least one substituted or unsubstituted 5-membered to 7-membered aromatic or heterocyclic ring; Z' represents at least one substituted or unsubstituted 5-membered to 7-membered aromatic or heterocyclic ring which contains in its ring (i) a nitrogen atom acting as a coordinating atom or (ii) a carbon atom to which a nitrogen atom acting as a coordinating atom is directly bonded at a position adjacent to the position to which the azo group is bonded; and G represents a metal-chelating group.

2. A recording liquid as in claim 1, wherein the aromatic or heterocyclic ring formed by Z or Z' is substituted with one or more of an alkyl group, an alkoxy group, an aryloxy group, an aralkyl group, an aryl group, a halogen atom, a cyano group, a nitro group, an ester group, a carbamoyl group, an acyl group, an acylamino group, a sulfonyl group, a sulfamoyl group, a sulfonamido group, an amino group, an alkylamino group, an arylamino group, and a hydroxyl group.

3. The recording liquid as in claim 1, wherein the rings formed by Z and Z' are selected from the group consisting of a benzene ring, a naphthylene ring, a pyridone ring, a quinoline ring, a pyrazole ring, a thiophene ring, an indole ring, and a pyrazolotriazole ring.

4. A recording liquid as in claim 2, wherein the aromatic or heterocyclic ring formed by Z or Z' is substituted or unsubstituted with one or more of a substituted or unsubstituted alkyl group having from 1 to 25 carbon atoms, a substituted or unsubstituted alkoxy group having from 1 to 25 carbon atoms, a halogen atom, a cyano group, a nitro group, a substituted or unsubstituted alkylsulfamoyl group having from 1 to 25 carbon atoms, a substituted or unsubstituted phenylsulfamoyl group having from 6 to 30 carbon atoms, an ester group having from 1 to 25 carbon atoms, a carbamoyl group having from 1 to 25 carbon atoms, an acyl group having from 1 to 25 carbon atoms, an acylamino group having from 1 to 25 carbon atoms, a sulfonyl group having from 1 to 25 carbon atoms, a sulfonamido group having from 1 to 25 carbon atoms, an alkylamino or arylamino group represented by the formula

wherein $R_1$ and $R_2$ each represents a hydrogen atom, a substituted or unsubstituted alkyl group having from 1 to 25 carbon atoms, or a substituted or unsubstituted phenyl group, or $R_1$ and $R_5$ are taken together to form a 5- to 6-membered ring, and a hydroxyl group.

5. A recording liquid as in claim 1, wherein G is selected from the group consisting of a hydroxyl ion, a carboxylate ion, a sulfonamido ion, a sulfamoyl ion, an amino group, and an alkylthio group.

6. A recording liquid as in claim 5, wherein G is a hydroxyl ion.

7. A recording liquid as in claim 1, wherein said compound has at least one oil-solubilizing group bonded to the dye moiety.

8. A recording liquid as in claim 7, wherein said oil-solubilizing group is selected from a substituted or unsubstituted alkyl group having from 5 to 30 carbon atoms and a substituted or unsubstituted aryl group having from 10 to 35 carbon atoms.

9. A recording liquid as in claim 1, wherein said compound is represented by formula (II)

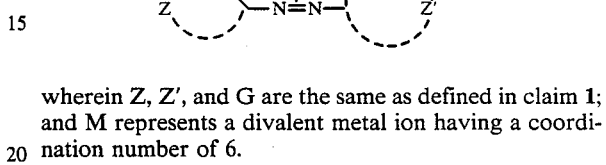

wherein Z, Z', and G are the same as defined in claim 1; and M represents a divalent metal ion having a coordination number of 6.

10. A recording liquid as in claim 9, wherein M represents nickel (II), zinc (II), or cobalt (II).

11. A recording liquid as in claim 9, wherein M represents nickel (II).

* * * * *